United States Patent
Sipe et al.

(10) Patent No.: US 9,639,821 B2
(45) Date of Patent: May 2, 2017

(54) INTEGRATED PHYSICAL AND ELECTRONIC MAIL DELIVERY

(75) Inventors: Stanley Wayne Sipe, Mansfield, TX (US); Michael O. Norris, Colleyville, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 776 days.

(21) Appl. No.: 13/474,067

(22) Filed: May 17, 2012

(65) Prior Publication Data

US 2013/0031188 A1  Jan. 31, 2013

Related U.S. Application Data

(60) Provisional application No. 61/511,786, filed on Jul. 26, 2011.

(51) Int. Cl.
*G06F 15/16* (2006.01)
*G06Q 10/08* (2012.01)

(52) U.S. Cl.
CPC .................... *G06Q 10/08* (2013.01)

(58) Field of Classification Search
CPC .................................................. G06Q 10/08
See application file for complete search history.

(56) References Cited

U.S. PATENT DOCUMENTS

| | | | |
|---|---|---|---|
| 7,478,140 B2 | 1/2009 | King et al. | |
| 8,346,674 B2* | 1/2013 | Agrawal et al. | 705/330 |
| 8,719,180 B2* | 5/2014 | Biasi | B07C 3/00 |
| | | | 705/330 |
| 8,799,179 B2* | 8/2014 | Amato | B07C 3/00 |
| | | | 705/332 |
| 2002/0059430 A1 | 5/2002 | Orbke et al. | |
| 2002/0095306 A1* | 7/2002 | Smith | G06Q 10/08 |
| | | | 705/333 |
| 2003/0167250 A1* | 9/2003 | Sash | G06F 17/30867 |
| 2004/0139033 A1* | 7/2004 | Amato | 705/400 |
| 2005/0246550 A1 | 11/2005 | Orbke et al. | |
| 2005/0259658 A1* | 11/2005 | Logan | H04L 67/306 |
| | | | 370/392 |
| 2007/0156423 A1* | 7/2007 | Foth | G06Q 10/0832 |
| | | | 709/206 |
| 2008/0104176 A1* | 5/2008 | Agrawal | G06Q 10/08 |
| | | | 709/206 |

(Continued)

OTHER PUBLICATIONS

ISO/IEC 18004;2006E; Information technology—Automatic Identification and Data Capture Techniques—QR Code 2005 Bar Code Symbology Specification (Sep. 1, 2006) (124 pgs).

(Continued)

*Primary Examiner* — Abdullahi E Salad (57) ABSTRACT

Systems, methods, and computer-readable media. A method includes receiving virtual mail piece data and receiving a mail piece, the mail piece having machine-readable indicia on an exterior surface. The method includes decoding the indicia to produce a mail piece identifier and identifying a recipient of the mail piece using the mail piece identifier. The method includes retrieving subscription preferences from a recipient database according to the identified recipient. The method includes electronically sending a virtual mail piece to the recipient, the virtual mail piece corresponding to the mail piece, the virtual mail piece data, and the subscription preferences.

24 Claims, 4 Drawing Sheets

(56) References Cited

U.S. PATENT DOCUMENTS

| | | | | |
|---|---|---|---|---|
| 2008/0104191 A1* | 5/2008 | Agrawal | .......... | G07B 17/00024 |
| | | | | 709/207 |
| 2008/0158615 A1* | 7/2008 | Parkos et al. | ................. | 358/402 |
| 2008/0320092 A1 | 12/2008 | Campbell et al. | | |
| 2010/0131759 A1* | 5/2010 | Pintsov | ......................... | 713/168 |
| 2012/0179766 A1* | 7/2012 | Gracy et al. | ................. | 709/206 |
| 2013/0311394 A1* | 11/2013 | Smith | .................... | G06Q 10/08 |
| | | | | 705/333 |
| 2016/0004992 A1* | 1/2016 | Dearing | ............... | G06Q 10/083 |
| | | | | 705/50 |

OTHER PUBLICATIONS

United States Postal Service Document—Intelligent Mail Barcode (4-State Customer Barcode); USPS-B-3200E; (pp. 1-57).

* cited by examiner

INTEGRATED PHYSICAL AND ELECTRONIC MAIL DELIVERY

CROSS-REFERENCE TO RELATED APPLICATION

This application claims the benefit of the filing date of U.S. Provisional Patent Application 61/511,786, filed Jul. 26, 2011, which is hereby incorporated by reference.

TECHNICAL FIELD

The present disclosure is directed, in general, to mail processing systems and methods.

BACKGROUND OF THE DISCLOSURE

Improved systems are desirable.

SUMMARY OF THE DISCLOSURE

Various disclosed embodiments include systems, methods, and computer-readable media. for sending a mail piece recipient a corresponding virtual mail piece. A method includes receiving virtual mail piece data and receiving a mail piece, the mail piece having machine-readable indicia on an exterior surface. The method includes decoding the indicia to produce a mail piece identifier and identifying a recipient of the mail piece using the mail piece identifier. The method includes retrieving subscription preferences from a recipient database according to the identified recipient. The method includes electronically sending a virtual mail piece to the recipient, the virtual mail piece corresponding to the mail piece, the virtual mail piece data, and the subscription preferences.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may he centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Various disclosed embodiments include systems and methods for providing mail recipients a "preview" of physical mail that will be delivered to them, as well as additional information regarding the content and subject matter of the mail. In various embodiments, a mail processing system can read indicia on a mail piece, identify the recipient and an electronic mail (email) address fir the recipient, and send an email to the recipient about the mail item, preferably before the mail item is delivered.

Figure 1:
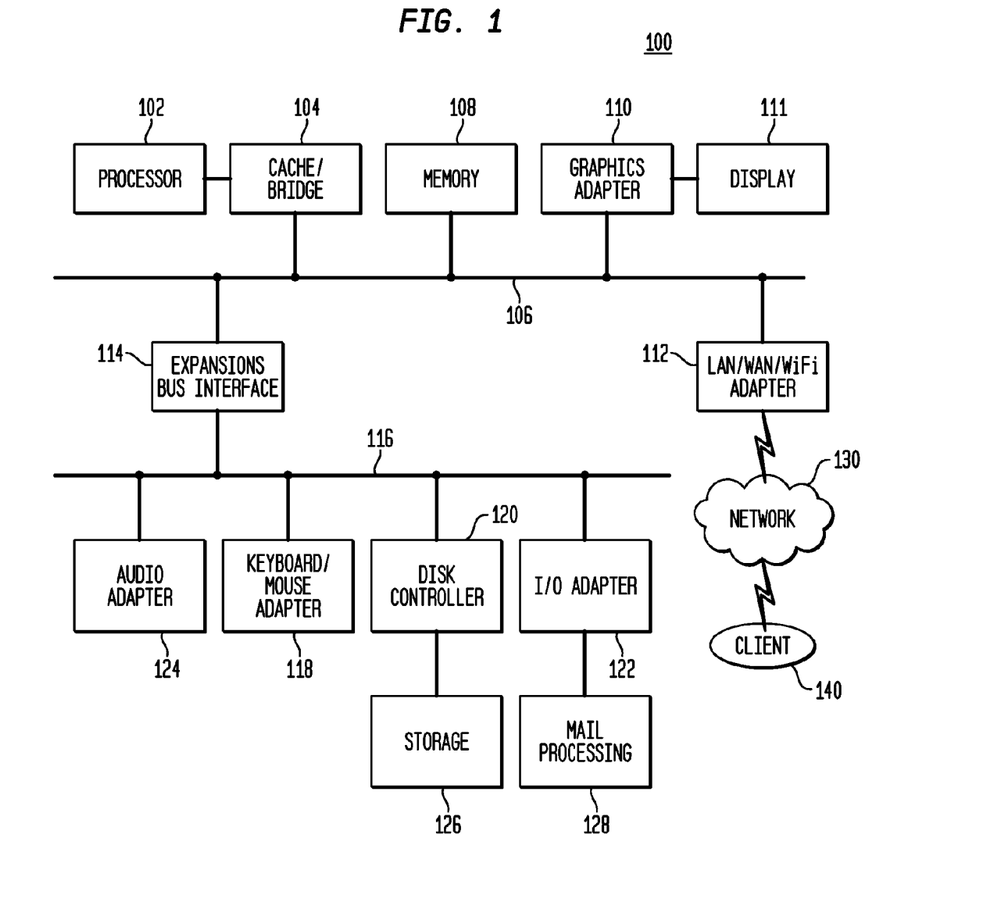
FIG. 1 depicts a block diagram of a data processing system in which an embodiment can be implemented.

FIG. 1 depicts a block diagram of a data processing system in which an embodiment can be implemented, for example, as one of the mail processing systems described herein, and can be configured to perform processes as described herein. The mail processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives, compact disk read only memories (CD-ROMs), and digital versatile disks (DVDs), and other known optical, electrical, or magnetic storage devices.

I/O adapter 122 can be connected to mail processing devices 128, as described herein, to image, scan, x-ray, measure, transport, label, address process, sort, and otherwise processes the mail pieces in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also perform other data processing system or server processes described herein. Data processing system 100 can communicate over network 130 with one or more client systems 140, which are also not part of data processing system 100, but can be implemented, for example, as separate data processing systems 100. A client system 140 can be, for example, a computer system, mobile device, or other data processing system used by the mail recipient as described herein.

FIG. 1 is particularly directed to mail processing systems, but similar systems can be used for processing any object, with mail processing devices 128 replaced with suitable devices for similar processing of the other objects.

As used herein, "mail piece" or "mailpiece" refers to the physical mail item, whether a letter, parcel, package, magazine, flat, or other physical item to be delivered by a public or private delivery service (including but not limited to the United States Postal Service (USPS), private courier services, and others). The "virtual mail piece" or "virtual mail piece" refers to the email, web page, or other electronic information transmitted or delivered to the recipient, as described herein, that corresponds to a respective physical mail item. The "mail processing system", in addition to the exemplary hardware description above, refers to a system that is configured to process mail in volume, operated by a public or mail processing service (including but not limited to the USPS, private courier and processing services, and others). The mail processing system can include multiple interacting systems, whether located together or apart, that together perform processes as described herein.

Quick Response Codes (QR codes) can be placed onto mail advertisements, magazines, business cards, or physical goods. When scanned by a customer, more information can be provided to the customer, such as a contact number or a display of text. In some cases, the QR code can direct the electronic scanning device (such as a smart phone) via a URL link to a website to obtain additional information about the product or service. QR codes and their structure are known to those of skill in the art, and are described, for example, in ISO/IEC 18004:2006 *Information technology—Automatic identification and data capture techniques—QR Code* 2005 *bar code symbology specification* (Sep. 1, 2006), incorporated herein by reference.

The downside to the current implementation of QR codes is that the end consumer must physically scan the mail item with a barcode reader or similar device, such as a smartphone, to obtain the additional advertiser's information. The end consumer may not have the capability to scan QR codes, may simply not notice the QR code, may not understand how to use the QR code, or may choose to ignore the QR code altogether.

Disclosed embodiments use automated scanning of a QR code or other machine-readable indicia for automatic recipient notification of the expanded information content related to a mail piece via electronic messaging while the mail piece is still in transit. Disclosed embodiments can be used to provide the mail piece content to a large audience of recipients that may prefer not to read hardcopy, and can provide mail piece content to recipients who are in transit or otherwise away from their usual physical address.

The techniques described herein can be particularly useful for advertising and for transaction-based mailings, such as checks, gift cards, etc.

While particular embodiments are described in terms of QR codes, the techniques described herein are not limited to QR codes but can also use other indicia such as the full service intelligent Mail® barcode (IMb™) printed on mass mailings today, other printed indicia, or other machine-readable identifiers such RFID tags. In other embodiments, the indicia can include the printed recipient name and address information itself, when scanned and recognized using an optical character recognition (OCR) process. A complete specification for the IMb™ can be found in USPS Document USPS-B-3200E, incorporated by reference.

In the case of utilizing hut service IMb™, the full service mailer does not have to change their current mail layout, but could simply subscribe to a new service that performs processes as described herein and submit the corresponding data. The unique identifier in the IMb™ can be used to perform the processes described herein.

The indicia on a mail piece is automatically identified by the mail processing system, and used to retrieve and send to the mail piece recipient a corresponding virtual mail piece or electronic link to where the virtual mail piece can be accessed. In a USPS implementation, such processes can be performed by a mail processing system that includes the USPS Mail Processing Equipment at Processing and Distribution Centers (P & DC).

In various embodiments, the mail recipient consumer can subscribe to the new information service as described herein, with the mail processing service such as the USPS. The mail processing system stores information for associating each mail piece with the recipient's destination electronic mailbox. This process can be implemented using a number of methods, including those described in United States Patent Applications 2004/0139033, 2005/0246550, and 2002/0059430, incorporated herein by reference.

The mail processing system can scan each mail piece to identify the recipient electronic address according to the indicia. The mail processing system can then send a synthetic hi-resolution image of the physical item along with the extended information to the intended recipient via email, SMS, or other agreed upon electronic messaging mechanisms.

The information encoded in the indicia can include, but is not limited to, data such as a personal message and/or URL links to the mailer's website showing not only the contents of the physical item (as the virtual mail piece), but also expanded information such as web site offers, other links and access multi-media advertisements. The information encoded in the indicia can identify the recipient and the corresponding virtual mail piece.

The recipient can be notified that the physical mail item is in transit and can optionally preview the contents of the mail item (and more) before receiving the physical item. The advanced timing is particularly useful in the event of time-dependent sales and events.

In some embodiments, the advertiser can be notified of the end consumer's interest in this advertisement by receiving feedback from the system identifying the unique consumer for which the indicia information represented. This brings more value to the advertiser and to the consumer mail.

Figure 2:
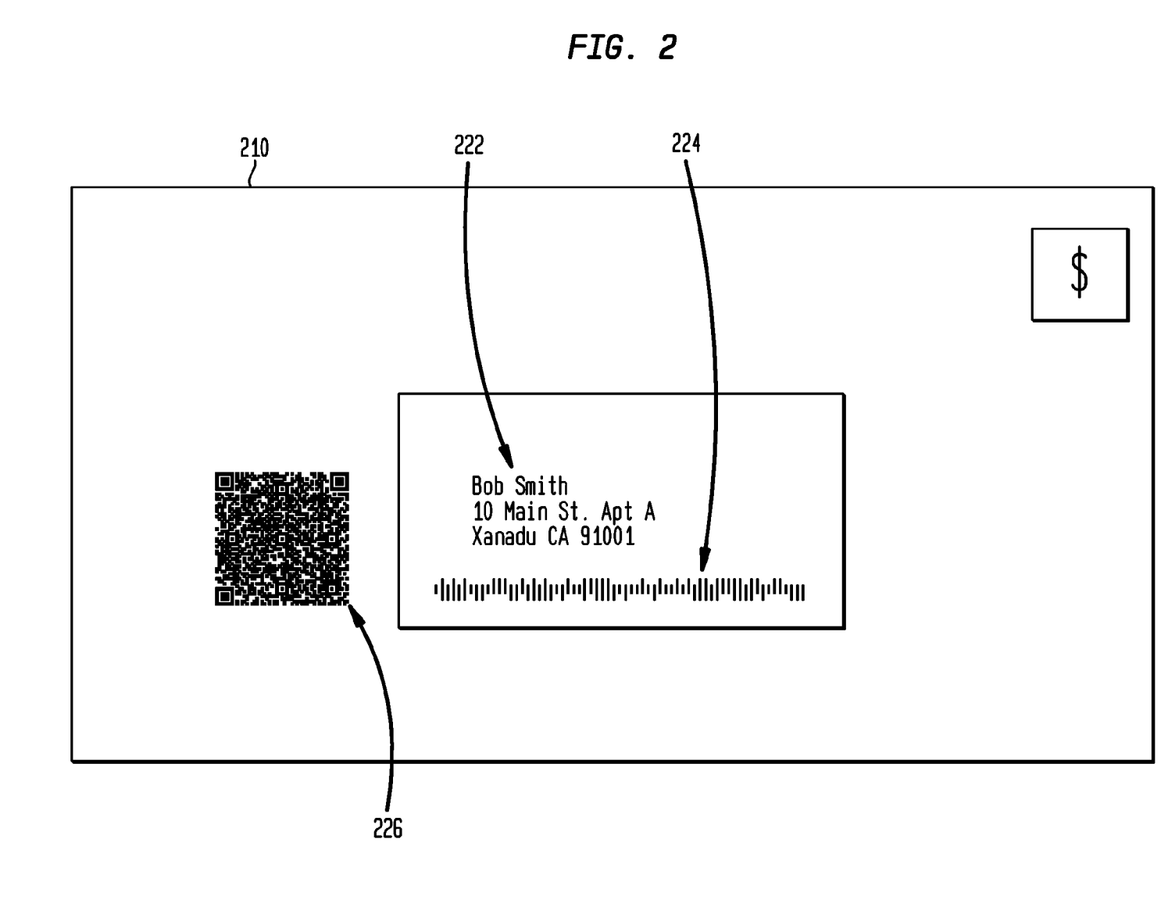
FIG. 2 shows an example of a mail piece and indicia that can be used as described herein.

FIG. 2 shows an example of a mail piece and indicia that can be used as described herein. In this example, mail piece 210 is shown, addressed to recipient 222 (including name and address). This example shows both an IMb™ 224, and a QR code 226, both of which are examples of indicia that can be used as described herein. Of course, in various embodiments, IMb™ 224 and a QR code 226 need not both be present on any mail piece; only one suitable indicia is used in some embodiments. In other cases, the recipient 222 name and address can be used as the indicia.

Figure 3:
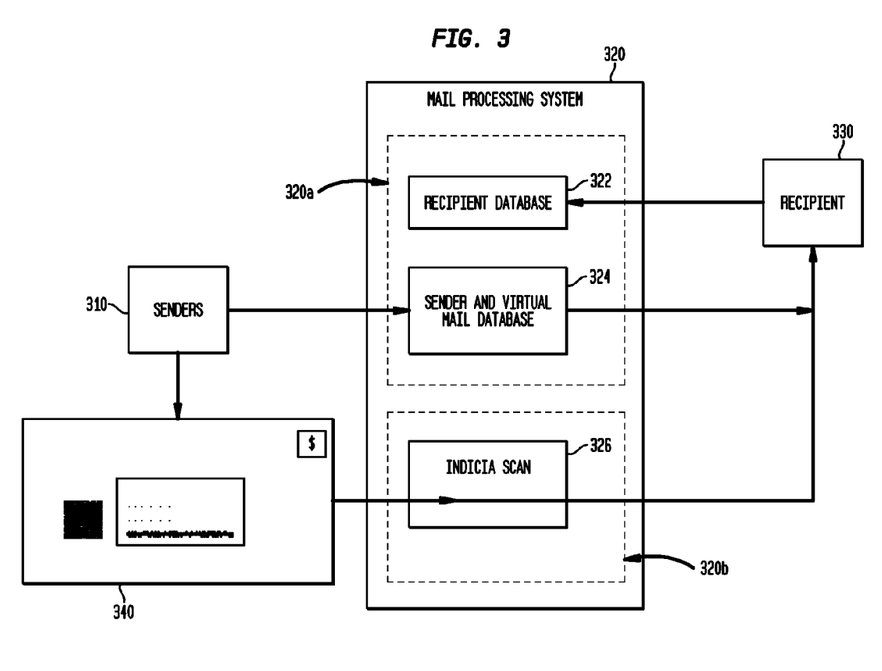
FIG. 3 depicts a functional Hock diagram of a process and system in accordance with disclosed embodiments.

FIG. 3 depicts a functional block diagram of a process and system in accordance with disclosed embodiments. In this figure, one of senders 310 is mailing a mail piece 340 to one of recipients 330. The mail piece 340 is processed during transit by mail processing system 320, which may perform any number of conventional mail processing functions, such as sorting, imaging, etc., and also performs processes as described herein. Mail processing system 320 is shown here as a single integrated system, but can be implemented using any number of separate mail processing systems, whether distributed or located together, that are configured to together perform processes as described herein. Such a mail processing system or systems may be referred to in the singular as the "system" below.

In this figure, mail processing system 320 maintains a recipient database 322. Recipient database 322 includes information about recipients 330. Particular information can include, but is not limited to, recipient identifiers, physical addresses, names, email addresses, phone or other contact information, subscription preferences, and other information. Subscription preferences can include such information as the types or subject matter of mail that the recipient desires to receive as a virtual mail piece, preferences as to where or how the virtual mail piece should be delivered (or linked), preferences as to whether a sender can be informed that the virtual mail piece is delivered, read, or accessed, and other information. Preferably, the mail processing system can receive some or all of this information from the respective recipients 330, over the Internet or otherwise, so that recipients can manage their own subscription preferences and other information.

Mail processing system 320 also maintains a sender and virtual mail database 324. Sender and virtual mail database 324 includes information about senders 310. Particular information can include, but is not limited to, sender identifiers, mail piece identifiers which can correspond to information in the mail piece indicia, and mail piece descriptions that can describe the type or subject matter of the mail pieces associated with each mail piece identifier. Sender and virtual mail database 324 also includes virtual mail piece data. Virtual mail piece data can include partial or entire images of the contents of each respective mail piece (as contrasted to simply including an image of the exterior of the mail piece), additional content related to the mail piece, links to additional information such as links to the respective sender's website, and other information. Virtual mail database can include information that associates mail piece identifiers with specific recipients. In particular, the sender and virtual mail database 324 can include information that relates each mail piece identifier with recipient information that identifies the recipient of that mail piece.

Note that, as described above, mail processing system 320 can be implemented using multiple physical mail processing systems, whether located together or apart, that together perform processes as described herein. For example, mail processing system 320 can include a first mail processing system 320a that performs the data functions with respect to the virtual mail piece, and also can include a second mail processing system 320b that performs the physical mail handling processes for the physical mail piece. In such implementations, each of the individual mail processing systems can communicate with the others to perform the processes described herein.

A sender 310 provides the virtual mail piece data and other information to the mail processing system 320 to populate the sender and virtual mail database 324. In particular, the sender 310 provides virtual mail piece data for a set of mail pieces being mailed, including mail piece 340.

Sender 310 also provides the mail pieces, including mail piece 340, to the mail processing system to be delivered to the respective recipients 330. Each mail piece 340 includes a machine-readable indicia that includes encoded information that can include, for example, a mail piece identifier as described herein.

As mail processing system 320 processes each mail piece 340, it scans the indicia on the exterior of the mail piece, at 326, to extract a mail piece identifier for that mail piece. The mail processing system can then continue to process each mail piece 340 for delivery to the appropriate recipient 330 in a conventional manner.

Based on the mail piece identifier, the system can retrieve recipient information and virtual mail piece data from the sender and virtual mail database 324. The system can then use the recipient information to query the recipient database 322 to find a matching recipient identifier.

The system can determine whether the virtual mail piece data corresponds to subscription preferences for that recipient. For example, the system can determine whether the subject matter or content of the mail piece matches the subject matter or content for which the recipient has agreed to receive electronic notifications. That is, if the virtual mail piece data indicates that the subject matter of the respective mail piece is "golf", the system can determine whether the subscription preferences for that recipient includes golf-related material.

If the system determines that the virtual mail piece data corresponds to acceptable material for that recipient according to the subscription information, the system can then send a virtual mail piece to the recipient, as an email or other electronic communication, according to the recipient information. The virtual mail piece is based on the virtual mail piece data, and can include, in particular, an image of some or all of the contents of the corresponding mail piece, or any of the other information described herein, or can include a link such as an Internet Uniform Resource Locator (URL) that allows the recipient to retrieve such an image or information from the mail processing system, as well as other potential information. Based on the subscription preferences, the system can also inform the sender 310 that the virtual mail piece has been delivered or accessed. Typically, the virtual mail piece will be delivered to the recipient electronically in advance of the mail piece physical delivery.

In some embodiments, processes can execute on the mail processing system or on the recipient's computer or other device that inform the sender when a virtual mail piece has been accessed by the intended recipient. Such a notification can occur when the SMS message, e-mail, or other electronic message is read or opened.

In these cases, the system or device can send a notification to the sender indicating that the recipient has accessed the message, and in some cases, can identify both the specific recipient and specific message. In still other embodiments, the application can send data indicating that a website or URL was accessed as a result of the virtual mail piece being sent to the recipient. For example, if a virtual mail piece includes a link to a webpage, and that webpage is accessed from the virtual mail piece, the mail processing system or other device can notify the recipient that the website was accessed, and in some cases can identify both the specific recipient and specific virtual mail piece, for example using recipient-specific URLs in the virtual mail piece.

One important aspect of some embodiments is that the recipient is isolated from the sender. The subscription information allows the recipient to specify and limit the virtual mail pieces he receives, and allows the recipient database information to reside with a "trusted" mail processor rather than being given to the senders themselves.

Figure 4:
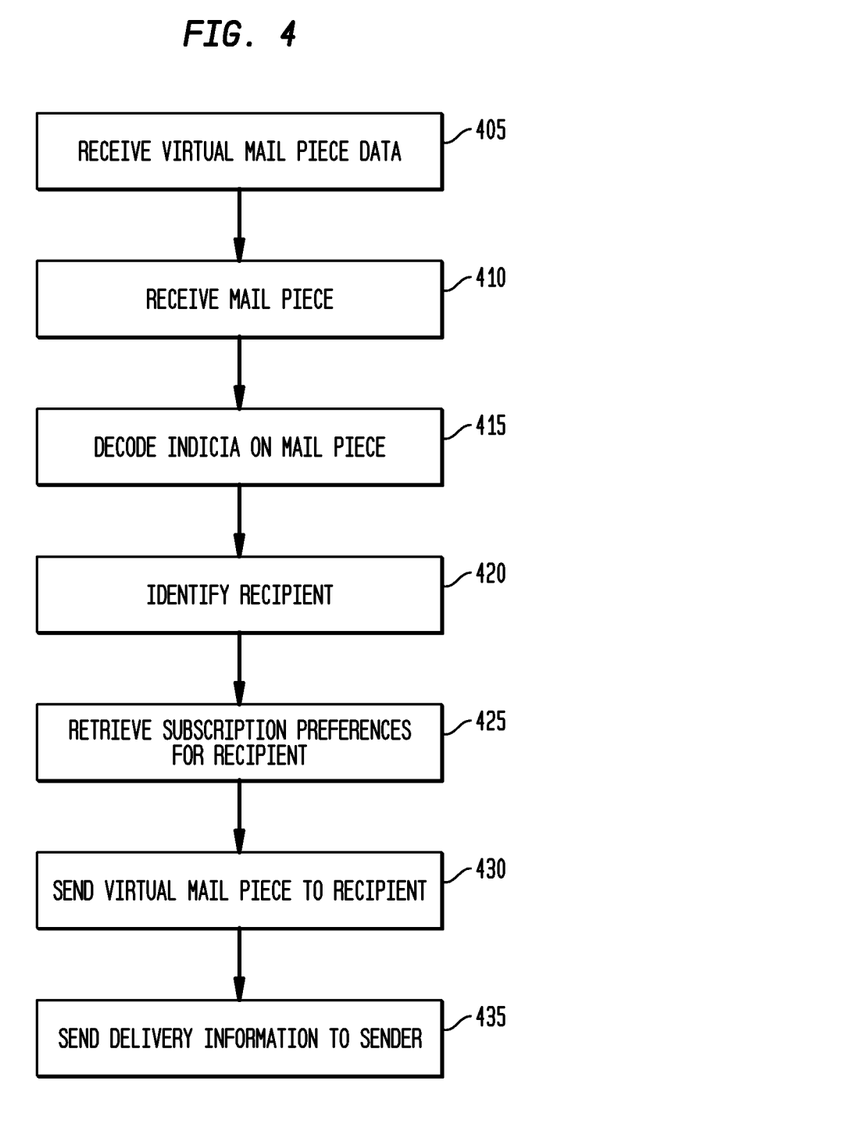
FIG. 4 depicts a flowchart of a process in accordance with disclosed embodiments.

FIG. 4 depicts a flowchart of a process in accordance with disclosed embodiments.

The system receives virtual mail piece data (step 405). The virtual mail piece data can be stored by the system, such as in a sender and virtual mail database.

The system receives a mail piece (step 410). The mail piece has an indicia on the exterior of the mail piece and is addressed to a recipient.

The system reads and decodes the indicia (step 415) to determine data including a mail piece identifier. The system can perform other mail processing on the mail piece, and the mail piece can then be sent for delivery to the recipient.

The system identifies the recipient for the mail piece (step 420). This can include using an OCR process on an image of the mail piece, or using the mad piece identifier to retrieve the recipient from the virtual mail piece data.

The system retrieves subscription preferences from a recipient database according to the identified recipient (step 425). The subscription information can include, in particular, whether the recipient has agreed to receive virtual mail pieces, and can include other information as described herein.

The system sends a virtual mail piece to the recipient (step 430), corresponding to the mail piece, the stored virtual mail piece data, and the subscription preferences.

The system can also send delivery information to a sender of the mail piece (step 435).

The steps of the process in FIG. 4 can be omitted, repeated, performed in a different order, performed concurrently or sequentially, or otherwise, unless specifically described to be performed in a certain order or required by the sequence of operations. The various features, processes, and functions described above can be combined in still further embodiments, but no specific feature should be considered essential to the claims below unless specifically noted.

Various embodiments can provide a number of features with specific technical and commercial advantages. Various embodiments can notify recipients that specific advertisements, transaction information, or other subject matter is being delivered to their physical location within a specified time period. Recipients can view the contents of the mail piece before physical receipt of the mail piece. Recipients can view more or different information in the virtual mail piece than may be contained within the physical mail piece, including multimedia data.

Note that disclosed embodiments differ significantly from conventional use of QR codes and similar codes, in that the recipient does not ever have to scan the QR code at all. Instead, the system scans the code, on the mail piece provided by the sender, and delivers the corresponding virtual mail piece to the recipient, either in a "push" fashion by directly sending in an email or other electronic communication, or when the recipient activates a link in the electronic communication. Further, the virtual mail piece includes some or all of the contents of the respective mail piece, and can include other audio or visual information, and is not limited to being an image of the exterior of the mail piece itself.

Various embodiments can reduce advertisement creators cost by supplying a minimum amount of information in a physical advertisement mail piece with electronic links to a much larger amount of information in the virtual mail piece. For example, the entire contents of a catalog can be represented by a small flyer with overview of what's "new" in the catalog itself, or a virtual mail piece could include a movie or hi-resolution color images which would normally be expensive to print.

Various embodiments can give feedback to the advertiser about the mailings hit and who specifically is interested in their product and can provide proof of download for delivery confirmation. Such information can be recipient-specific, or can be aggregate information. In some embodiments, a system as described herein can provide a means to send an electronic money transaction or RSVP. Disclosed embodiments do not necessarily decrease the volume of physical mail sent through the postal system but can increase its value to both senders and recipients.

It is important to note that white the disclosure includes a description in the context of a fully functional system, those skilled in the art will appreciate that at least portions of the mechanism of the present disclosure are capable of being distributed in the form of computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a mail processing system, the method comprising:
   receiving at least one of a portion of contents of a mail piece and a description of a subject matter of the mail piece at a mail processing system prior to receiving the mail piece;
   storing in a sender and virtual mail database virtual mail piece data that includes the at least one of a portion of contents of a mail piece and a description of a subject matter of the mail piece prior to scanning an image of the mail piece;
   storing in a recipient database subscription preferences for a recipient, the subscription preferences subscribed by the recipient to include the subject matter of a mail piece to be delivered as a virtual mail piece and how and/or when the virtual mail piece should be delivered;
   receiving the mail piece at the mail processing system, the mail piece having machine-readable indicia on an exterior surface;
   processing, by the mail processing system, the mail piece to read the indicia on the exterior surface of the mail piece;
   decoding the indicia to produce a mail piece identifier;
   identifying a recipient of the mail piece and virtual mail piece data using the mail piece identifier;
   retrieving the subscription preferences from the recipient database according to the identified recipient;
   retrieving the virtual mail piece data from the sender and virtual mail database using the mail piece identifier;
   determining whether to send the recipient the virtual mail piece data based on the retrieved subscription preferences of the recipient;
   electronically sending a virtual mail piece to the recipient, the virtual mail piece corresponding to the mail piece, the virtual mail piece data, and the subscription preferences;
   delivering the virtual mail piece to the recipient prior to delivery of the mail piece to the recipient; and
   informing the sender when the virtual mail piece has been accessed by the recipient, the virtual mail piece including more or different information than contained in the mail piece.

2. The method of claim 1, wherein the recipient is identified by using the mail piece identifier to retrieve the recipient from the virtual mail piece data.

3. The method of claim 1, wherein the indicia also identifies the virtual mail piece to be electronically sent to the recipient.

4. The method of claim 1, wherein the mail processing system notifies a sender that the virtual mail piece has been electronically sent to the recipient.

5. The method of claim 1, wherein the mail processing system receives the subscription preferences from the recipient.

6. The method of claim 1, wherein processing the mail piece to read the indicia further comprising:
   scanning an image of the mail piece after storing the virtual mail piece data in the database.

7. The method of claim 1, further comprising:
   sending an automatic notification of the mail piece in transit for delivery in a specified time period to the recipient based on the machine readable indicia.

8. A mail processing system, comprising:
   at least one processor;
   a storage device; and
   mail processing equipment, the mail processing system configured to:
   receive at least one of a portion of contents of a mail piece and a description of a subject matter of the mail piece at the mail processing system prior to receiving the mail piece;
   store in a database virtual mail piece data that includes at least one of a portion of contents of a mail piece and a description of a subject matter of the mail piece prior to scanning an image of the mail piece;
   store in a recipient database subscription preferences for a recipient, the subscription preferences subscribed by the recipient to include the subject matter of a mail piece to be delivered as a virtual mail piece and how and/or when the virtual mail piece should be delivered;
   receive the mail piece, the mail piece having machine-readable indicia on an exterior surface;
   process the mail piece to read the indicia on the exterior surface of the mail piece by scanning an image of the mail piece after storing the virtual mail piece data in the database;
   decode the indicia to produce a mail piece identifier;
   identify a recipient of the mail piece and virtual mail piece data using the mail piece identifier;
   retrieve the subscription preferences from the recipient database according to the identified recipient;
   retrieve the virtual mail piece data from the sender and virtual mail database using the mail piece identifier;
   determine whether to send the recipient the virtual mail piece data based on the retrieved subscription preferences of the recipient;
   electronically send a virtual mail piece to the recipient, the virtual mail piece corresponding to the mail piece, the virtual mail piece data, and the subscription preferences;
   deliver the virtual mail piece to the recipient prior to delivery of the mail piece to the recipient; and inform the sender when the virtual mail piece has been accessed by the recipient, the virtual mail piece including more or different information than contained in the mail piece.

9. The mail processing system of claim 8, wherein the recipient is identified by using the mail piece identifier to retrieve the recipient from the virtual mail piece data.

10. The mail processing system of claim 8, wherein the indicia also identifies the virtual mail piece to be electronically sent to the recipient.

11. The mail processing system of claim 8, wherein the mail processing system notifies a sender that the virtual mail piece has been electronically sent to the recipient.

12. The mail processing system of claim 8, wherein the mail processing system receives the subscription preferences from the recipient.

13. The mail processing system of claim 8, wherein the mail processing system sends an automatic notification of the mail piece in transit for delivery in a specified time period to the recipient based on the machine readable indicia.

14. A non-transitory computer readable medium having program instructions stored thereon executable by one or more processors to:
receive virtual mail piece data of the mail piece at a mail processing system prior to receiving the mail piece;
store in a database the virtual mail piece data of the mail piece prior to scanning an image of the mail piece;
store in a recipient database subscription preferences for a recipient, the subscription preferences subscribed by the recipient to include the subject matter of a mail piece to be delivered as a virtual mail piece and how and/or when the virtual mail piece should be delivered;
receive the mail piece, the mail piece having machine-readable indicia on an exterior surface;
process the mail piece to read the indicia on the exterior surface of the mail piece by scanning an image of the mail piece after storing the virtual mail piece data in the database;
decode a machine-readable indicia on an exterior surface of a mail piece to produce a mail piece identifier;
identify a recipient of the mail piece and virtual mail piece data using the mail piece identifier;
retrieve the subscription preferences from the recipient database according to the identified recipient;
retrieve the virtual mail piece data from the database using the mail piece identifier;
determine whether to send the recipient the virtual mail piece data based on the retrieved subscription preferences of the recipient;
electronically send a virtual mail piece to the recipient, the virtual mail piece corresponding to the mail piece, the virtual mail piece data, and the subscription preferences;
deliver the virtual mail piece to the recipient prior to delivery of the mail piece to the recipient; and
inform the sender when the virtual mail piece has been accessed by the recipient, the virtual mail piece including more or different information than contained in the mail piece.

15. The computer readable medium of claim 14, wherein the recipient is identified by using the mail piece identifier to retrieve the recipient from the virtual mail piece data.

16. The computer readable medium of claim 14, wherein the indicia also identifies the virtual mail piece to be electronically sent to the recipient.

17. The computer readable medium of claim 14, further including instruction to notify a sender that the virtual mail piece has been electronically sent to the recipient.

18. The computer readable medium of claim 14, wherein the virtual mail piece data of the mail piece includes a portion of contents of the mail piece.

19. The computer readable medium of claim 14, wherein the virtual mail piece data of the mail piece includes a description of a subject matter of the mail piece.

20. The computer readable medium of claim 14, wherein the virtual mail piece data of the mail piece includes partial or entire images of the contents of the mail piece.

21. The computer readable medium of claim 14, wherein the virtual mail piece data of the mail piece includes a link to a sender website.

22. The computer readable medium of claim 14, wherein the virtual mail piece data of the mail piece is determined by a sender.

23. The computer readable medium of claim 14, wherein the virtual mail piece data of the mail piece is determined by a recipient.

24. The computer readable medium of claim 14, further including instruction to send an automatic notification of the mail piece in transit for delivery in a specified time period to the recipient based on the machine readable indicia.

* * * * *